Dec. 9, 1958     R. P. LATHROP     2,863,668
APPARATUS FOR ESTABLISHING CONCENTRIC OPERATION
OF PHONOGRAPH SOUND GROOVES Filed April 21, 1953     5 Sheets-Sheet 1

INVENTOR
ROBERT P. LATHROP
BY
*Edward C. Hathaway*
ATTORNEY

Dec. 9, 1958  R. P. LATHROP  2,863,668
APPARATUS FOR ESTABLISHING CONCENTRIC OPERATION
OF PHONOGRAPH SOUND GROOVES
Filed April 21, 1953  5 Sheets-Sheet 3

INVENTOR.
ROBERT P. LATHROP
BY
ATTORNEY

Dec. 9, 1958 R. P. LATHROP 2,863,668
APPARATUS FOR ESTABLISHING CONCENTRIC OPERATION
OF PHONOGRAPH SOUND GROOVES
Filed April 21, 1953 5 Sheets-Sheet 4

ECCENTRICITY VS. CORRECTION-POSITION RELATION

FREE FOLLOWER

FIG. 15

CORRECTION POSITION

CAPTIVATED FOLLOWER

FIG. 16

INVENTOR.
ROBERT P. LATHROP
BY
ATTORNEY

Dec. 9, 1958 R. P. LATHROP 2,863,668
APPARATUS FOR ESTABLISHING CONCENTRIC OPERATION
OF PHONOGRAPH SOUND GROOVES
Filed April 21, 1953 5 Sheets-Sheet 5

INVENTOR.
ROBERT P. LATHROP
BY
ATTORNEY

United States Patent Office 2,863,668
Patented Dec. 9, 1958

2,863,668

APPARATUS FOR ESTABLISHING CONCENTRIC OPERATION OF PHONOGRAPH SOUND GROOVES

Robert P. Lathrop, Chevy Chase, Md.

Application April 21, 1953, Serial No. 350,195

14 Claims. (Cl. 274—9)

My invention relates to apparatus for obtaining a high degree of faithful reproduction of music recorded on phonograph records of the disk type.

The conventional phonograph record depends on, among other things, a high degree of concentricity of the grooved stamping with the pilot hole and on proper centering of the pilot hole on the turntable spindle to give faithful reproduction of recorded music and to prevent record "wow."

"Wow" is a variation in pitch of the notes being reproduced. It is present in an appreciable proportion of even the best makes of records because of inadequate centering of the stamping during playing. It is cyclic, usually corresponding in frequency of occurrence to the speed of record rotation. It is sometimes attributed to warped records but is often caused, in the main, by radial eccentricity of the pilot hole and the recording grooves, or simply by worn or oversize pilot holes which fail to locate the stamping concentric with the center of rotation. This has the effect of alternately raising and lowering the musical pitch during each revolution by changing the speed with which the needle travels in the groove.

One object of my invention is to provide means whereby music recorded on phonograph records of the disk type may be reproduced with a high degree of fidelity regardless of whether or not the pilot hole is precisely concentric with the recording grooves.

Another object is to provide improved means for automatically adjusting the center of rotation of the records while they are being played so that the actual center of rotation is made to coincide with the mechanical center of the spiral grooves.

A further object is to provide a mechanism for automatically adjusting the center of rotation of records in a manner that is relatively simple in construction, operation, and maintenance.

Other objects and advantages will be more apparent to those skilled in the art from the following description of the accompanying drawings in which.

The ability of music listeners to detect changes in pitch of sustained tones varies with individuals. In general, however, changes in tone frequencies less than ½ percent occurring at the cyclic speed of rotation of a phonograph usually are not detectable. A change in tone frequency of ½ percent can be caused by an eccentricity of the record stamping relative to the actual center of rotation of ¼ percent of the distance from the center to the needle of the tone arm. This effect of wow is most noticeable, consequently, when the innermost portions of the stamping are being played. The minimum diameter of a normal stamping is about 3⅝ inches. Thus eccentricities greater than .0025 × 3.6/2 inches, or approximately .0045 inch can be expected to give disagreeable results. Any adequate correction, therefore, requires that the stamping be positioned relative to the center of rotation so as to reduce its eccentricity to at least the foregoing value. One form of my invention, employing an unmotorized follower, is theoretically capable of reducing the eccentricity to the value of groove pitch/$2\pi$. In the case of 78 r. p. m. records this is approximately .0015 inch. With microgroove records the limit would be reduced by the ratio of the pitches. In a modified form of my invention employing a motorized follower the theoretical limit can be further reduced.

The apparatus by which my invention accomplishes the automatic centering of phonograph records consists of means for detecting eccentricity of the grooves of a record as soon as it is started to be played and quickly repositioning the record relative to its center of rotation to eliminate the undesired eccentricity.

Figure 1:
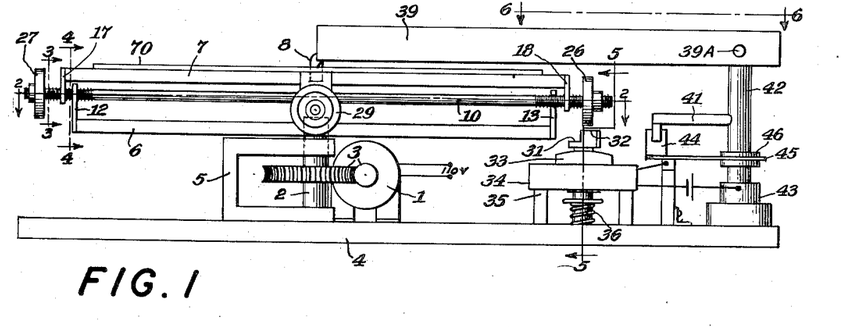
Fig. 1 is a side elevation of a turntable with my improved centering mechanism associated therewith.
Figures 2, 3, 4, 5:
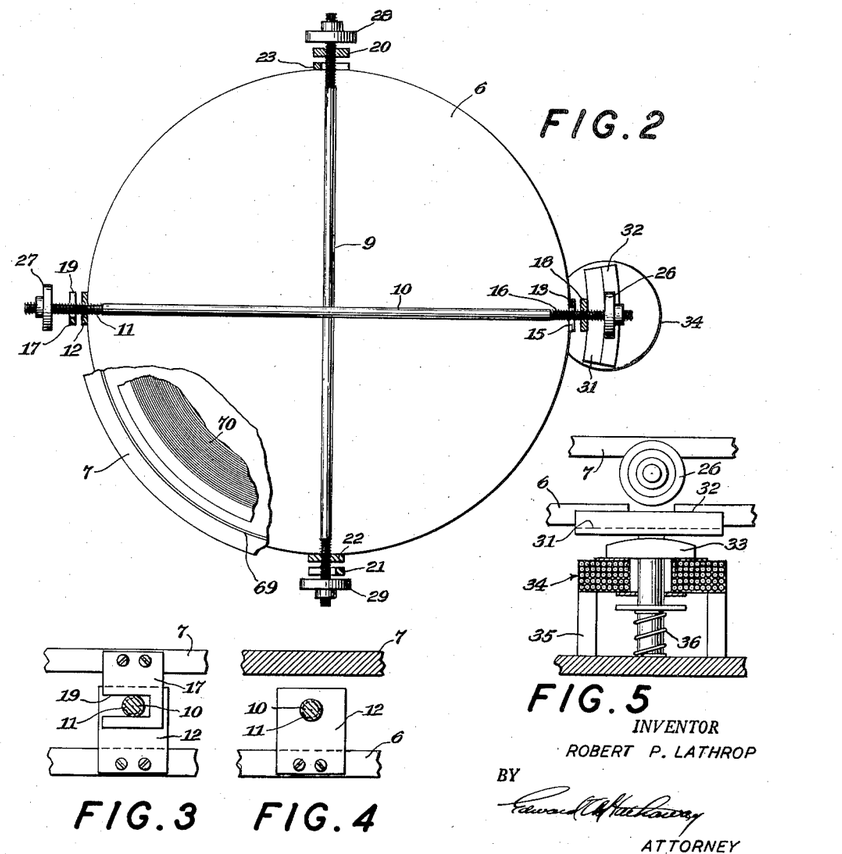
Fig. 2 is a sectional plan view of Fig. 1 taken substantially on the line 2—2 of Fig. 1 with certain parts shown in full rather than in section for purposes of simplicity and clarity, and including a fragmentary view of the turntable and of a record disposed thereon.
Fig. 3 is a vertical section taken substantially on the line 3—3 of Fig. 1.
Fig. 4 is a section taken substantially on the line 4—4 of Fig. 1.
Fig. 5 is a sectional view taken along the line 5—5 of Fig. 1 with certain parts omitted for purposes of clarity.

My eccentricity detecting means and adjusting mechanism is shown as applied to a usual motor driven record player consisting of a motor 1, Fig. 1, driving a vertical shaft 2 through any suitable gears 3, these members being suitably supported by a base 4 and bracket 5. A driving turntable or member 6 is rigidly secured to the turntable shaft 2. A record supporting turntable 7 is superimposed above member 6 and is provided with the usual record centering pin 8 attached to it. The record turntable 7 is supported by the driving member 6, and is also radially adjustable with respect thereto, by the provision of a pair of rotatable shafts or rods 9 and 10, Fig. 2, disposed substantially at right angles to each other. Each rod may have threads of opposite hand on each end or, alternatively, each rod may have threads of the same hand but different pitch on each end to permit the very fine adjustment required of the turntable 7 relative to the driving member 6, and obtained as described in the following paragraphs. The rod 10 has threads 11 engageable with a threaded opening in an upwardly extending bracket 12 which, as shown in Fig. 1, is secured to the edge of driving member 6. The other end of rod 10 is supported by a bracket 13 secured to the edge of driving member 6 at the other diametrically opposed edge of the member. However, the bracket 13, as shown in Fig. 2, has a slot 15 through which the threads 16 of the rod freely pass. The record turntable 7 has similar but downwardly extending brackets 17 and 18, threads 16 of rod 10 engaging threads of bracket 18 while threads 11 pass freely through a slot 19 in bracket 17. The rod 9 is similarly connected to the driving member 6 and record turntable 7 by brackets 20, 21, and 22, 23, the brackets 20 and 22 having threaded engagement with rod 9 while brackets 21 and 23 merely have supporting slots. The ends of each of the rods have fixed thereto small wheels 26, 27, 28 and 29.

When rod 10 is rotated in one direction the threads 11, by being threaded in bracket 12 which is secured to driving member 6, will cause the rod to move, say to the right, and the threads 16 by being threaded in bracket 18 which is secured to the record turntable 7 will not only transmit the horizontal motion of rod 10 to turntable 7 but such threads 16, if of the opposite hand as threads 11, will also impart additional movement to the turntable. Similarly, when rod 9 is rotated the threaded brackets 20 and 22 secured respectively to turntable 7 and driving member 6 will cause horizontal movement of turntable 7. The record turntable is thus radially shiftable in any angular direction and to any extent necessary in a horizontal plane relative to the center of the driving shaft 2 depending upon the direction and amount of rotation of the rods 9 and 10. The threads at the ends of each rod may, if desired, be of the same hand but different pitch to give a finer adjustment through a differential action.

To effect a desired degree of rotation of the rods, I provide means for engaging the wheels 26, etc., to cause their rotation as the turntable revolves, until such time as the record grooves become concentric to the axis of shaft 2. The wheel engaging means comprises, as shown in Figs. 1, 2 and 5, a plate having a wheel engaging lower surface 31 disposed beneath the path of travel of the wheels 28 and 29, Fig. 2, and another wheel engaging upper surface 32 also disposed beneath the path of wheels 26 and 27, both plate surfaces being in a lowered position out of reach of the wheels whenever no record adjustment is necessary. The offset surfaces 31 and 32 are necessary because the screw rods 9 and 10, not being able to pass through each other, are disposed in different horizontal planes although the surfaces 31 and 32 could be a single surface if the two sets of wheels were of different diameters. The wheel plate is secured to the core 33, Fig. 5, of a solenoid 34 so that when the solenoid is de-energized the plate is raised so as to engage the wheels as they pass over the fixed location of the solenoid. The solenoid is suitably supported in a bracket 35 mounted on base 4. When the solenoid is energized it is pulled down against a spring 36 so that when de-energized the spring raises the plate to engage the wheels.

If the solenoid is momentarily raised when wheel 26 passes over surface 32, the rod 10 will be rotated counter-clockwise looking leftward toward the outer end of wheel 26, Fig. 1, whereas if the solenoid is raised when wheel 27 passes over surface 31 the rod 10 will be oppositely rotated. The wheels 28 and 29 are similarly reversely rotatable. Thus the record turntable can be shifted to adjust for eccentricity occurring at any angle.

Figure 6:
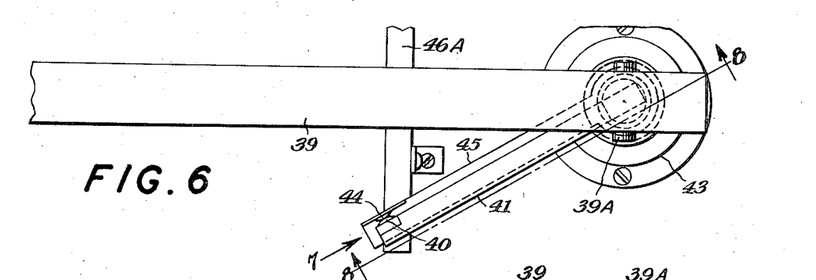
Fig. 6 is a fragmentary plan view of that portion of Fig. 1 showing the needle arm and one means for detecting the eccentricity of the record grooves with respect to the center of rotation of the phonograph disk viewed generally in the plane of line 6—6 of Fig. 1.
Figures 7, 8:
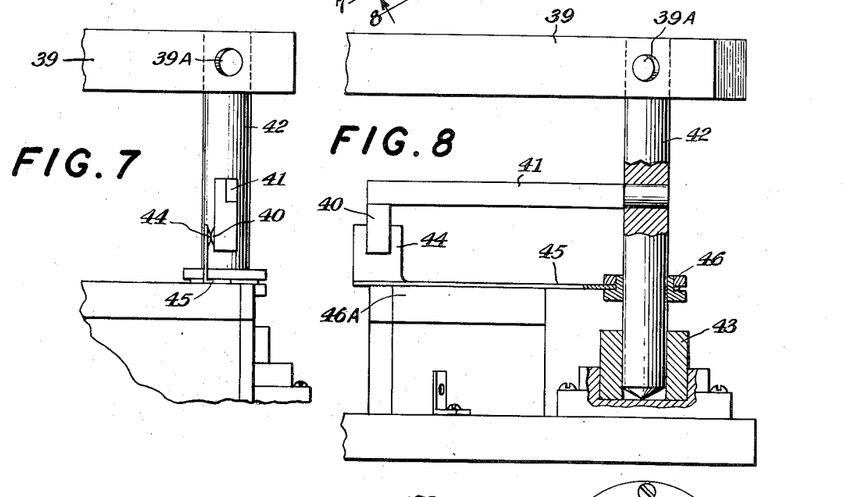
Fig. 7 is an end view of the eccentric sensitive device viewed in the direction of arrow 7 in Fig. 6.
Fig. 8 is a side elevation of the eccentric sensitive device viewed substantially along the line 8—8 of Fig. 6 with parts broken away to show details of construction.

To detect and correct for record eccentricities larger than the pitch $2\pi$, approximately, I provide an electric contact follower which is operated whenever the eccentricity of the record grooves relative to the actual center of rotation causes a tone arm 39, Figs. 1, 6 and 8, to move away from the center of rotation. The tone arm is connected by a horizontal pivot pin 39A to an oscillatable vertical shaft 42 and is thus permitted to have usual vertical and horizontal movements. As shown in Figs. 6, 7 and 8, an electric contact 40 is mounted on a push arm 41, which is rigidly secured to the tone arm shaft 42 whose lower end is journaled in a bearing 43. The movement of arm 41 and contact 40 are thus responsive to the trace of the spiral record grooves and if the grooves are running concentrically the responsive movement will be continuous in a radially inward direction and at a uniform rate but if the grooves are eccentric the responsive movement will be oscillatory as the trace moves inward. Another electric contact 44, Figs. 6, 7 and 8, is mounted on a follower arm 45 pivotally supported in a suitably insulated flange 46 which is also mounted on tone arm shaft 42. The contacts 40 and 44 are in engagement when the record grooves are concentric. To permit separation of the contacts during eccentricity of the grooves, the arm 45 lightly rests on a friction support 46a so as to maintain this arm in a given position whenever the trace responsive push arm 41 oscillates its contact 40 away from contact 44. The friction between arm 45 and support 46a is also great enough to resist any dragging effect of flange 46 during angular movement of the shaft 42. As the trace responsive push arm 41 is moved away from the follower 45 the contacts 40 and 44 are opened, thereby breaking a simple current circuit to the solenoid to de-energize it and allow spring 36, Fig. 5 to raise the plate for actuating the adjusting wheels. It will be understood that by locating the wheel engaging plate relative to the tone arm circumferentially in the most advantageous position the mechanism can be made to give optimum correction of eccentricity of the record regardless of the direction in which the eccentricity initially occurs.

Figure 11:
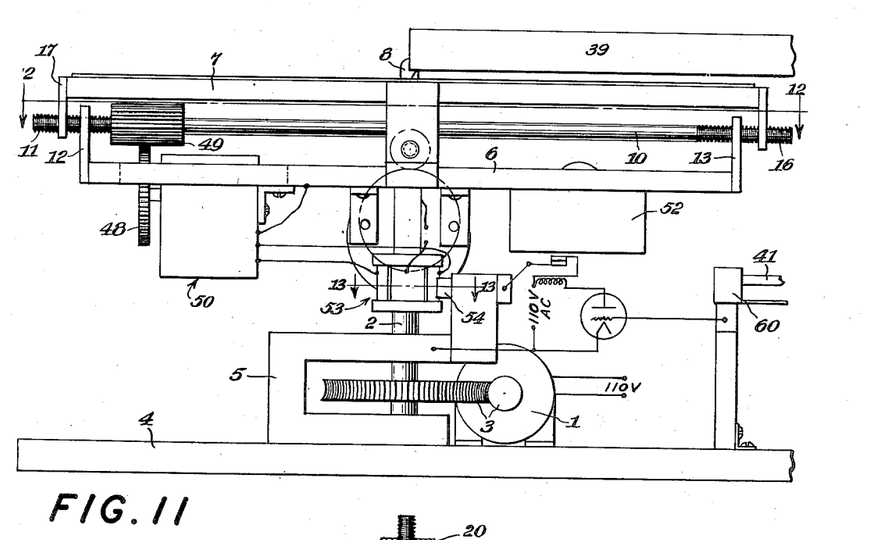
Fig. 11 is a modified mechanism for adjusting the record disk to obtain concentricity of the record grooves.
Figure 12:
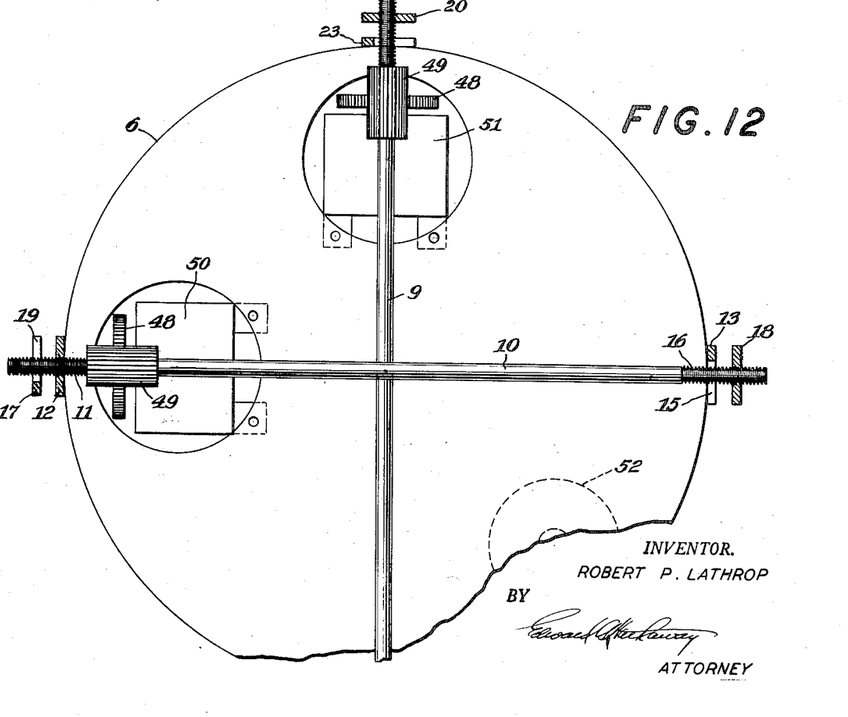
Fig. 12 is a sectional plan view taken substantially on the line 12—12 of Fig. 11 with parts shown in section for purposes of clarity.
Figure 13:
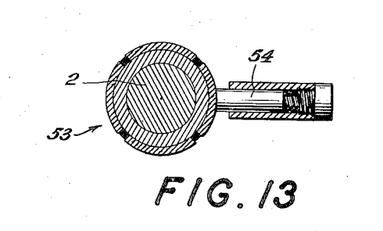
Fig. 13 is a section taken on the line 13—13 of Fig. 11.
Figure 14:
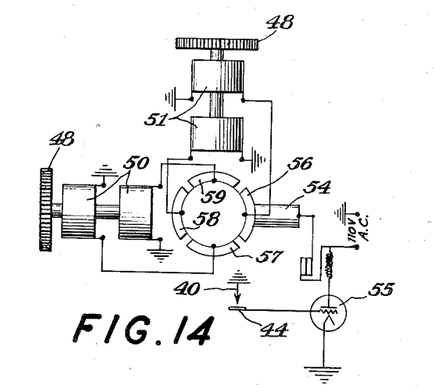
Fig. 14 is a schematic electrical wiring diagram of the modification of Fig. 11.

In the modification shown in Figs. 11 to 14, I employ a similar electric controlling contact and arrangement of threaded rods, supporting brackets, rotatable driving member and record turntable or holder as described in connection with the Fig. 1 form of the invention. Hence, these parts and other identical parts are given the same reference numbers as in Fig. 1. In Figs. 11 and 12 each of the adjusting rods is driven through gears 48 and 49 by separate reversible motors 50 and 51 mounted on the driving turntable 6 and suitably counterbalanced by a weight 52 secured to member 6. A four segment armature generally indicated at 53, Fig. 13, is built on the driving spindle 2 so as to rotate with it. As shown in Figs. 11, 13 and 14, a brush 54 distributes a signal to the armature from the controlling contacts 40, 44 so that the threaded rods 9 and 10 are motor driven in the direction and to the extent as to reduce the eccentricity. Thus the solenoid actuated wheel engagement plate and wheels are eliminated. If desired, the electrical contacts 40, 44 may operate a vacuum tube controlled relay 55, Fig. 14, which in turn will energize the proper adjusting motor 50 or 51 (or the solenoid of the mechanism of Fig. 1) through the armature segment 56, 57, 58 or 59, opposite the brush 54 at the time a signal is received, such as upon opening of the contacts 40 and 44. In the position of segment 56 shown in Fig. 14, motor 51 is energized for rotation in one direction but if the diametrically opposite segment 58 is adjacent the brush 54 at the time of the signal then the motor 51 is rotated in the opposite direction. The other contacts 57 and 59 similarly reversely operate motor 50.

There are three principal arrangements of the eccentricity-sensitive device.

The first is the free follower type shown in Figs. 6, 7 and 8 wherein the follower 44 is moved in one direction only by the radial motion of the tone arm 39. Eccentricity greater than $P/2\pi$, where P equals the pitch of the record groove will cause the rod 41 to move away from the follower 44 thus controlling the electrical circuit for effecting adjustment of the screw rods 9 and 10. The follower 44 is moved only by the centripetally directed motion of rod 41 for the type of eccentricity correcting mechanism shown in Figs. 1 to 8. The theoretically correct position for the wheel engaging plate is 45° in advance of the pickup if the wheel engaging plate moves the record turntable toward the center from that position.

Figures 9, 10:
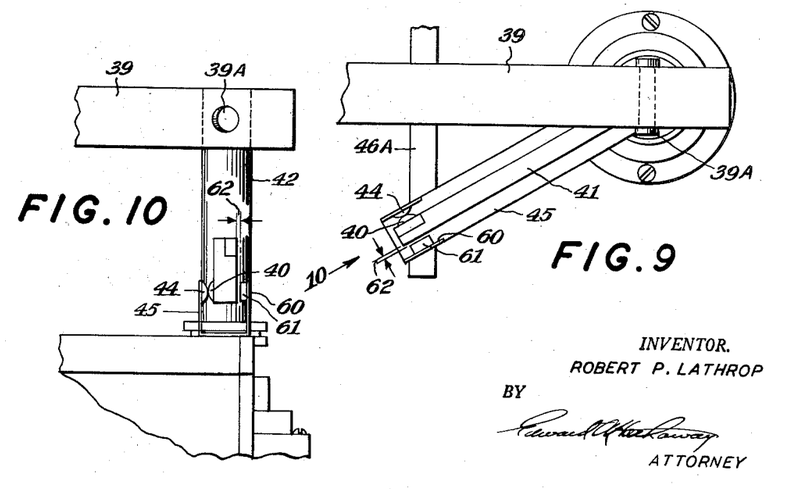
Fig. 9 is a plan similar to Fig. 6 but showing a modified form of the eccentric responsive device.
Fig. 10 is an end view taken in the direction of arrow 10 of Fig. 9.

The second arrangement is shown in the modification of Figs. 9 and 10 where the follower arm 45 is of the captive type in that it is moved by both the centrifugally and centripetally directed motions of pickup 39. This is effected by providing the follower arm 45 with an upstanding insulating lug 60 behind the contact 40. A small projection 61 is mounted on the inner side of lug 60 to insure a certain minimum clearance 62 sufficient to open and close the electrical contacts 40 and 44. By using this captive arrangement, the direction of correction can be made to more nearly coincide with the direction of eccentricity, regardless of the magnitude of the eccentricity. The wheel engaging plate is located, in a practical embodiment of this arrangement of the invention, about 75° in advance of the pickup 39 if the contact clearance is as small as the pitch. The minimum correction in eccentricity is, as before, pitch/$2\pi$. The captivated follower can give a quicker and more efficient correction than the free follower.

Similar considerations apply to the relative angular positions of the tone arm, commutator, and brush holder of the eccentricity correcting mechanism of Figs. 11 to 14.

Figure 17:
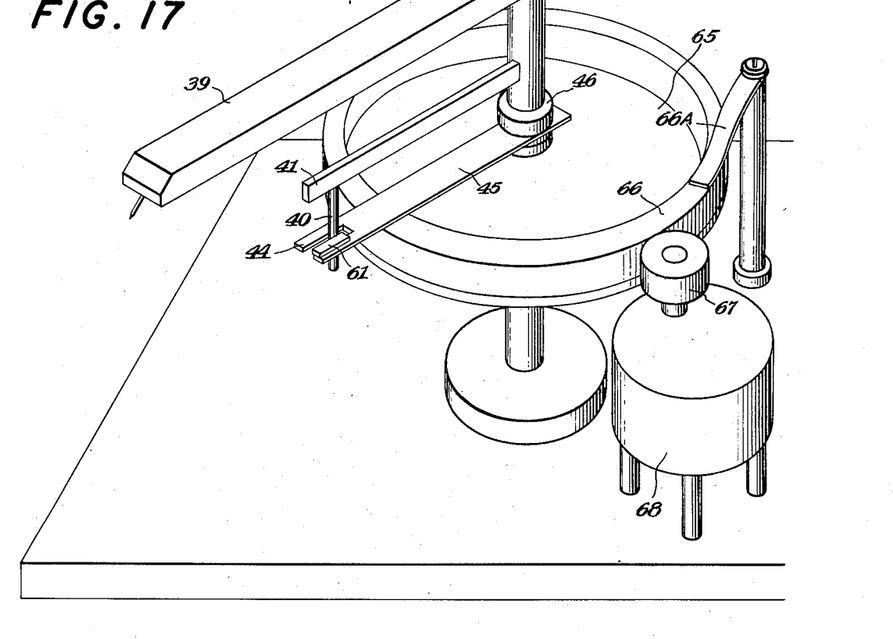
Fig. 17 is a perspective of a modified arrangement in which the follower is driven by an electric clock motor.

In the third arrangement, the motorized follower, as shown in Fig. 17, the push arm 41 and follower 45 and their contacts 44, 40 and stop 61 are merely diagrammatically illustrated, although it will be understood that all of these elements are constructed identically to the modification shown in Figs. 9 and 10. The hub 46 for pivotally supporting follower 45 is provided with a driving disk 65 of electrical insulating material having an electrically conducting friction rim 66 whose periphery is engaged by a driving wheel 67 of rubber or other electrical insulating material and an electrical collecting brush 66A. This wheel is driven by a suitable constant speed motor 68 such as a synchronous electric clock motor. The disk 65 and follower arm 45 are driven by the motor at a speed slightly different from that at which tone arm 39 is moved by the record grooves. As a result, smaller eccentricities, less than pitch/$2\pi$, as well as larger ones, can be corrected by this method, as compared to the corrections that can be made by the other modifications. The position of the correction for optimum operation is governed by the same conditions as for the non-motorized followers shown in the other modifications except that the effective pitch is used. The effective pitch equals the pitch, i. e., distance between the grooves, minus the equivalent distance the follower would be driven during one revolution of the turntable if the follower were moved only by the motorized mechanism, it being understood that the follower is moved in the same direction by the motorized mechanism as by the push rod. Motorization has the effect on the correcting mechanism (screws 9 and 10 and operating means therefor) of reducing the effective pitch of the record. Thus it is theoretically possible to correct for eccentricities less than pitch/$2\pi$. The optimum action angles given in the foregoing must be corrected for any time lag in response to the activating mechanism after the signal is received.

Through the use of an auxiliary groove 69, Fig. 2, in the record turntable 7 outside the edge of the record 70, in which groove the tone arm needle is placed during the record changing period and which detects any eccentricity of the record holder introduced for the preceding record, the record holder can be returned to a position substantially concentric with the center of rotation during the period in which the record is changed.

*Selection of type of follower.*—The kinematic analysis of the device (Appendix) shows that for a free follower the correcting signal will be received when the record eccentricity is orientated nearly coincident with the record needle if the eccentricity is large or the ratio of pitch/eccentricity is small. The signal position of the eccentricity will shift to an axis at right angles to the needle radius as the eccentricity decreases. Thus the signal point may shift nearly 90°. It is possible to choose a correcting point approximately 45° from the needle radius which will give correction with the component in phase with any eccentricity greater than the component out of phase. However, multiple correction cycles would be required since the out-of-phase component, in some cases, would be nearly as large as the in-phase.

If the follower is captive to the push rod the shift of the signal position with changes in eccentricity can be reduced. The closer the captivation, the smaller will the signal position shift be. It is seen from the kinematic analysis that if the captivation freedom equals the pitch, the signal position will shift only about 35°, being close to 80° from the needle radius for large eccentricities and reducing to 45°, approximately, for pitch/eccentricity ratios of two. As eccentricity becomes even smaller the signal position increases again toward 90°. Thus all corrections can be made substantially in phase with the eccentricity and in a minimum number of cycles.

Motorization of the follower has the effect of changing the effective pitch. Motorization can be in either direction as required. Driving the follower toward the center has the effect of reducing the apparent pitch and driving it away from center increases the apparent pitch. Whenever, for better workability of the device, a change of effective pitch is needed, it may be accomplished by motorization.

From the disclosure herein it is seen that I have provided an apparatus that provides for detection of eccentricity of the recording grooves of phonograph records relative to the center of rotation while they are being played, such detection being through the motion imparted to the tone arm by the pickup needle, together with means for radially adjusting the position of the record holder until the record grooves become concentric to the axis of rotation. Also the captive follower modification constitutes a means for deriving an electrical or other type signal from the detected eccentricity and controlling the timing of the signal relative to the angular position of the eccentricity so that the relation does not change excessively as the degree of eccentricity changes while the motorized follower drive provides a means for detecting eccentricities less than the pitch divided by $2\pi$, by changing the apparent pitch.

Figure 18:
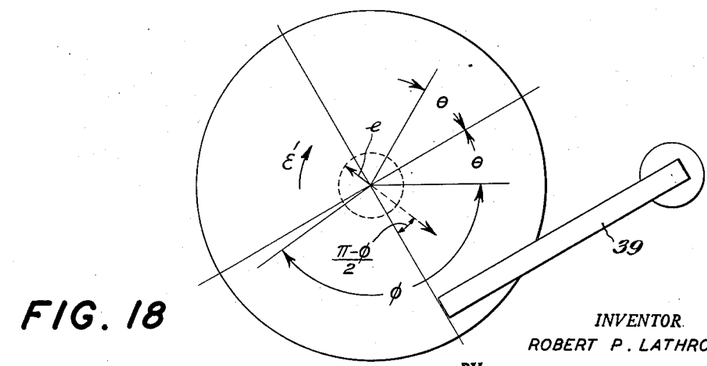
Fig. 18 is a diagram of the analysis of the free follower arrangement.

An analysis of the mechanics of the problem for determining optimum relations of the operating elements is illustrated in Fig. 18 and is described as follows:

*Analysis of free follower.*—If the distance between adjacent grooves of a record is the pitch, P, and the eccentricity of the record disk stamping relative to the actual center of rotation is $e$, and the turntable rotates clockwise viewed from above, and if $\theta$ is the absolute angle between the eccentricity and the axis perpendicular to the radius from the center of rotation through the needle of the tone arm, and $-w$ is the angular velocity, then:

(1) The needle may move away from the center during rotation of the turntable of $2\theta$, where $e \cos \theta = P/2\pi$, or $\cos \theta = P/2\pi e$.

(2) *Limiting case.*—The largest eccentricity for which the needle will not start moving away from the center is, when $\cos \theta = 1$, and $e = P/2\pi$. Thus eccentricities less than this cannot be detected if an unmotorized follower is used. With a motorized follower smaller eccentricities can be detected.

(3) The largest movement of the tone arm away from the center will occur when $e$ is at the position angle $\pi-\theta$ from the radius to the needle of the tone arm, and the needle will not return to the radial distance from the center it had when $e$ was at $\pi+\theta$ until $e$ turns through an additional angle $\phi$ to $\pi-\theta-\phi$. The greatest opening between the push rod moved by the stylus arm and the follower occurs at $\pi-\theta$ and equals $$2e \sin \theta - 2P\theta/2\pi$$

The total angle of rotation during which the push rod and follower are out of contact is $2\theta+\phi$. This is the duration of a signal from electric contacts on the rod and follower if all the elements are rigid in the sense of being non-elastic.

(4) During the interval in which $e$ moves from $\pi+\theta$ to $\pi-\theta-\phi$, which is the interval the rod is out of contact with the follower, the effect of $e$ in maintaining the separation is $=e \sin \theta + e \sin (\theta+\phi)$, and the effect of P in closing the separation is $P(2\theta+\phi)/2\pi$. Since the rod and the follower are in the same positions at the end of the interval as at the start the two effects are equal. Thus, $(2\theta+\phi)P/2\pi$ equals $e \sin \theta + e \sin (\theta+\phi)$, or, from (1), $(2\theta+\phi) \cos \theta = \sin \theta + \sin (\theta+\phi)$, or $\phi = [(\sin \theta + \sin (\theta+\phi))/\cos \theta] - 2\theta$.

(5) The center of the signal (out of contact) period, $2\theta+\phi$, is $(\pi+\theta-\theta-\phi)/2$ measured from the radius from the center to the needle. Thus the signal angle is $(\pi-\phi)/2$.

Figure 15:
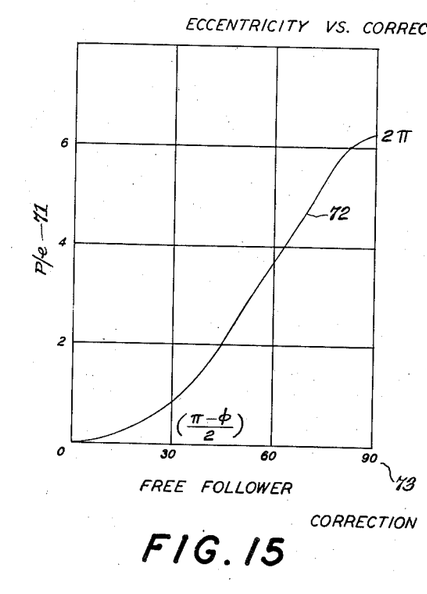
Fig. 15 is a curve showing the relation of the eccentricity and correction position of the free follower device shown in the modification Figs. 1 to 8.

(6) The optimum signal angle derived from (1), (4), and (5), for various values of $P/e$ is shown in curve 15.

The vertical scale 71 of Fig. 15 plots the dimensionless relation of groove pitch P divided by the eccentricity of the grooves, $e$, it being understood that the smaller the eccentricity the greater is the numerical value of this ratio. When $e$ becomes so small that the ratio of $P/e$ equals $2\pi$, the inward rate of motion of the tone arm as it travels in the record grooves, just equals the maximum outward effect of the eccentricity, so that the contacts 40 and 44 of Fig. 7 do not open. The curve 72 plots the means rotational position of the eccentricity during the period the contacts 40 and 44 are open for various ratios of $P/e$. The abscissae are obtained by substituting values of $P/e$ in ① to find corresponding values of $\theta$ and then substituting these values of $\theta$ in ④ to find $\phi$. Values of $(\pi-\phi)/2$ converted from radians to degrees are plotted to scale 73.

*Analysis of captive follower:* 7.—If the push rod is captivated to an unmotorized follower so that it cannot move further away from the follower than a distance corresponding to a radial travel of the needle of C by virtue of the follower's moving with the push rod in the centrifugal direction if the rod moves further than C, then the maximum possible opening is C. $-\phi'$ is the angle of rotation of the turntable, in this case, from $(\pi-\theta)$ until the contact closes. The closing effect of the pitch is $\phi' P/2\pi$. The continued opening effect of $e$ from the eccentricity position $\pi-\theta$ to $\pi-\theta-\phi'$ is $e \sin (\theta+\phi') - e \sin \theta$. The total opening effect equals the closing effect, or (7) $C + e \sin (\theta+\phi') - e \sin \theta$ equals $\phi' P/2\pi$, or (8) $\phi'/2\pi$ equals $$((C + e \sin (\theta+\phi') - e \sin \theta))/P$$

providing $C \angle 2 e \sin \theta - \theta P/\pi$ which is the greatest opening that would occur without captivation. If C is greater than this, $\phi$ replaces $\phi'$ and one reverts to Expression 4.

Figure 16:
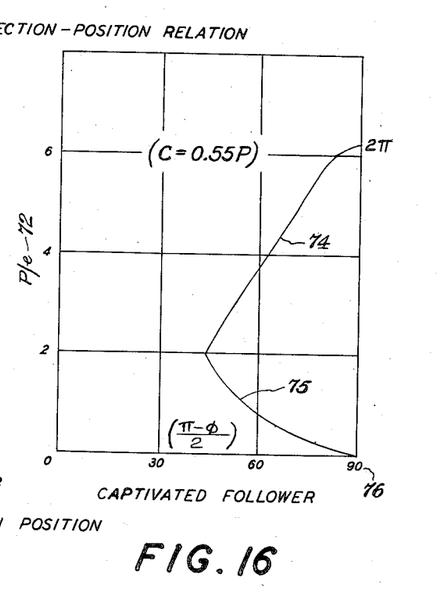
Fig. 16 is a similar type of curve for the follower device shown in the modified form of Figs. 9, 10 and 11.

In Fig. 16 is plotted the relation between pitch/eccentricity and the optimum angular position relative to the tone arm needle at which to apply the connecting adjustment to the record holder. As in the case of Fig. 15, the dimensionless ratio of $P/e$ is plotted for the ordinate scale, 72, of Fig. 16. The abscissae of the curve 74 are obtained by substituting values of $P/e$ in ④ and obtaining $$\frac{\pi-\phi}{2}$$

as in Fig. 15, for all values of $P/e$ where $$C \searrow 2e \sin \theta - \theta P/\pi$$

For purposes of illustration C, in Fig. 16, is given a value of 0.55 P. Where values of $P/e$ would give $C \angle 2e \sin \theta - \theta P/\pi$, Expression 8 is used to find $\phi'$ and the signal angle for the captivated follower, $(\pi-\phi')/2$, is plotted against the ordinate scale, 76, and yields the continuous portion of curve 75.

The desirable effect of the captivated follower in restricting the migration of the optimum angular position relative to the phonograph stylus at which the eccentricity correction should be made is clearly shown by a comparison of Figs. 15 and 16.

Use of C equal $2 \times e \sin \theta - \phi P/\pi$: (8) From this is found the maximum permissible value of C for a value of $\theta$ obtained from (4) where a permissible value of $\phi$ has been substituted small enough to insure workability of the device, for example, $\phi$ should preferably not exceed 90°.

The mechanisms disclosed herein are designed for conventional phonograph records in which the trace moves toward the center as the record rotates clockwise viewed from above. For records on which the trace would appear to move away from center with clockwise rotation mechanisms of the opposite hand are to be understood.

It will of course be understood that various changes in details of construction and arrangement of parts may be made by those skilled in the art without departing from the spirit of the invention as set forth in the appended claims.

I claim:

1. Apparatus for effecting concentric operation of the sound track grooves in phonograph record disks comprising, in combination, means for supporting and rotating a phonograph record disk in a given plane about the axis of rotation, means for shifting a record radially in any direction relative to such axis so that eccentricity of the sound track grooves may be reduced, detecting means controlled by the motion of the record grooves so as to respond to eccentricity of the grooves only when the direction of eccentricity during the course of rotation of the record disk is in a predetermined fixed rotative relation to said detecting means, and actuating means in fixed rotative relation to said detecting means and controlled thereby for actuating said shifting means so that said shifting means is selectively actuated in accordance with the rotative position of the disk supporting means corresponding to the rotative position of the eccentricity of the record disk to which the detecting means is responsive thus introducing an eccentricity in the disk supporting means which compensates for the eccentricity of the grooves of the record disk.

2. The combination set forth in claim 1 further characterized in that the detecting means includes an electric circuit for controlling the radial shifting means and a pair of cooperating contacts in said circuit for opening and closing the circuit in response to eccentricity of the disk grooves.

3. The combination set forth in claim 1 further characterized in that the detecting means includes an electric circuit for controlling the radial shifting means, a pair of cooperating contacts in said circuit for opening and closing the circuit, means for moving one of said contacts in accordance with trace movements of the disk grooves, and means whereby upon occurrence of groove eccentricity the second contact is pushed by the trace contact to a given position from which the trace contact can move away from and out of engagement with the second contact.

4. The combination set forth in claim 1 further characterized in that the detecting means includes an electric circuit for controlling the radial shifting means, a pair of cooperating contacts in said circuit for opening and closing the circuit, means for moving one of said contacts in accordance with the trace movements of the disk grooves, means for pushing the second contact by the trace contact, and means for frictionally holding said second contact in any static position to which it is moved by the trace contact whereby upon occurrence of groove eccentricity the contacts are closed in one direction of movement of the trace contact and in the other direction of movement of the trace contact the latter moves away from the frictionally held second contact.

5. The combination set forth in claim 1 further characterized in that the detecting means includes an electric circuit for controlling the radial shifting means, a pair of cooperating contacts in said circuit for opening and closing the circuit, means for moving one of said contacts in accordance with the trace movement of the disk grooves, means for pushing the second contact by the trace contact, means for frictionally holding the second contact in any static position to which it may be moved by the trace contact whereby upon occurrence of groove eccentricity the contacts are closed in one direction of movement of the trace contact and in the other direction of movement of the trace contact it moves away from the frictionally held second contact, and means for making the second contact captive of the trace contact so that only a predetermined separation of the contacts can occur.

6. The combination set forth in claim 1 further characterized in that the disk shifting means includes disk supporting means that is radially shiftable in any direction normal to its axis of rotation and to the magnitude required in response to the actuation of the detecting means so as to reduce the eccentricity detected thereby.

7. The combination set forth in claim 1 further characterized in that the disk shifting means includes two sets of cooperating screws and nuts respectively operative to adjust the disk in different radial directions, the axes of the sets being angularly disposed to each other and lying in planes substantially normal to the axis of disk rotation, and means controlled by the eccentricity detecting means for selectively adjusting said sets in accordance with the direction in which it is desired to adjust the disk for overcoming groove eccentricity.

8. The combination set forth in claim 1 further characterized in that the means for rotating the disk in a given plane includes a rotatable driving element and a disk supporting table, and the disk adjusting means includes a pair of screw threaded rods disposed substantially at right angles to each other in planes substantially parallel to the disk table and respectively operative to adjust the disk in different radial directions, means secured to said driving element and having threaded engagement with said rods, means secured to the disk table and also having threaded engagement with said rods, whereby the rods revolve with the disk table and upon rotation of the rods about their own axes the disk table is moved bodily in any given direction in accordance with whether one or both of the rods are rotated, and means controlled by the eccentricity detecting means for effecting said rod rotation in accordance with the direction and extent of eccentricity of the trace grooves.

9. The combination set forth in claim 1 further characterized in that the means for rotating the disk in a given plane includes a rotatable driving element and a disk supporting table, and the disk adjusting means includes a pair of screw threaded rods disposed substantially at right angles to each other in planes substantially parallel to the disk table, means secured to said driving element and having threaded engagement with said rods, means secured to the disk table and also having threaded engagement with said rods, whereby the rods revolve with the disk table and upon rotation of the rods about their own axes the disk table is moved bodily in any given direction in accordance with whether one or both of the rods are rotated, wheels secured to the outer ends of said rods so as to also rotate with the disk table, detecting means controlled by the motion of the record grooves so as to respond to eccentricity of the grooves only when the direction of eccentricity during the course of rotation of the record disk is in a predetermined fixed rotative relation to said detecting means, and means also in fixed rotative relation to said detecting means controlled by the detecting means for effecting said rod rotation in a given axial direction when viewed from the position of said rod rotating means, said rod rotating means effecting rotation of one of said rods only when one of said wheels is within the operating region of the rod rotating means, thus to partially rotate the rods in one or the other of opposite directions relative to the turntable and to adjust the eccentricity of the disk holder to compensate for the eccentricity of the record disk.

10. The combination set forth in claim 1 further characterized in that the shifting means includes electric motors rotatable with the disk support about its axis of rotation and electric means for controlling said motors in accordance with the action of the detecting means.

11. The combination set forth in claim 1 further characterized in that the detecting means includes an electric circuit for controlling the radially shifting means, a pair of cooperating contacts in said circuit for opening and closing the circuit, means for moving one of said contacts in accordance with the trace movement of the disk grooves, means for pushing the second contact by the trace contact, a moving element driven at a predetermined uniform speed, means for frictionally holding the second contact in any position on said moving element to which the second contact may be moved by the trace contact, whereby upon occurrence of groove eccentricity the contacts are closed in one direction of movement of the trace contact and in the other direction of movement of the trace contact the latter moves away from the frictionally held second contact, and means for making the second contact captive of the trace contact so that only a predetermined separation of the contacts can occur.

12. The combination set forth in claim 1 further characterized in that the record supporting means is provided with a groove disposed outside the area covered by the record disk and substantially concentric with the center of the record supporting means, the detecting means being controlled by the motion of said supporting means groove during the period when a record is being changed so as to selectively control said actuating means for operating said shifting means to return said supporting means, after it has been eccentrically adjusted to effect concentric operation of the record grooves of a previous record, to its initial substantially concentric position.

13. The combination set forth in claim 1 further characterized in that the means for rotating and supporting the disk in a given plane includes a rotatable driving element and a disk supporting table, and the means for shifting the disk includes a pair of screw threaded rods disposed substantially at right angles to each other in planes substantially parallel to the disk table, means secured to said driving element and having threaded engagement with said rods, means secured to the disk table and also having threaded engagement with said rods, whereby the rods revolve with the disk table and upon rotation of the rods about their own axes the disk table is moved bodily in any given direction in accordance with whether one or both of the rods are rotated, electric motors coupled to each of said rods so as to also rotate with the disk table, and the means which is in fixed rotative relation to said detecting means and controlled thereby for actuating said motors includes a commutator mounted on the axis of rotation of said disk driving element and rotates with this element so that said motors are selectively and reversibly driven to effect said introduction of eccentricity in the disk holder to compensate for the eccentricity of the grooves of the record disk.

14. The combination set forth in claim 1 further characterized in that the means for rotating the disk in a given plane includes a rotatable driving element and a disk supporting table, and the disk adjusting means includes a pair of screw threaded rods disposed substantially at right angles to each other in planes substantially parallel to the disk table, means secured to said driving element and having threaded engagement with said rods, means secured to the disk table and also having threaded engagement with said rods, whereby the rods revolve with the disk table and upon rotation of the rods about their own axes the disk table is moved bodily in any given direction in accordance with whether one or both of the rods are rotated, and the actuating means, which is in fixed rotative relation to said detecting means and controlled by the detecting means for selectively effecting said rod rotation effects axial rotation of either of said rods only when either of the rods is oriented about the axis of rotation of the turntable so that either end of either rod falls within the operating region of the rod rotating means and, further, the direction of axial rotation of said rods with respect to the turntable being dependent on which end of the rod is in the operating region of the rod rotating means, thus to partially rotate the rods in one or the other of opposite directions relative to the turntable and to adjust the eccentricity of the disk holder to compensate for the eccentricity in the record disk.

References Cited in the file of this patent

UNITED STATES PATENTS

| | | |
|---|---|---|
| 1,853,650 | Zullo | Apr. 12, 1932 |
| 1,969,895 | Loughridge | Aug. 14, 1934 |
| 2,104,241 | Proctor | Jan. 4, 1938 |
| 2,371,361 | Small | Mar. 13, 1945 |